US009773359B2

(12) United States Patent
Cimponeriu et al.

(10) Patent No.: US 9,773,359 B2
(45) Date of Patent: Sep. 26, 2017

(54) METHOD FOR DETECTING THE DETACHMENT OF A SENSOR DEVICE MOUNTED IN A WHEEL OF A VEHICLE

(71) Applicants: CONTINENTAL AUTOMOTIVE FRANCE, Toulouse (FR); CONTINENTAL AUTOMOTIVE GmbH, Hannover (DE)

(72) Inventors: Andrei Cimponeriu, Timisoara (RO); Olivier Fudelea, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/959,688

(22) Filed: Dec. 4, 2015

(65) Prior Publication Data
US 2016/0163134 A1 Jun. 9, 2016

(30) Foreign Application Priority Data
Dec. 8, 2014 (FR) ..................................... 14 62062

(51) Int. Cl.
*G06F 7/00* (2006.01)
*G07C 5/08* (2006.01)
(Continued)

(52) U.S. Cl.
CPC ........ *G07C 5/0808* (2013.01); *B60C 23/0481* (2013.01); *B60C 23/0488* (2013.01); *G01P 3/00* (2013.01); *G07C 5/02* (2013.01)

(58) Field of Classification Search
CPC .......... B60R 21/01516; B60R 21/0152; B60R 21/0153; B60R 21/01542; B60N 2/002;
(Continued)

(56) References Cited

U.S. PATENT DOCUMENTS 5,276,624 A * 1/1994 Ito .......................... B60K 28/16
180/282
7,164,117 B2 * 1/2007 Breed ............... B60R 21/01516
250/208.1
(Continued)

FOREIGN PATENT DOCUMENTS

DE  10 2004 037 875 A1  3/2006
DE  10 2004 064 002 A1  5/2007
(Continued)

OTHER PUBLICATIONS

FR Search Report, dated Jul. 8, 2015, from corresponding FR application.

*Primary Examiner* — McDieunel Marc
(74) *Attorney, Agent, or Firm* — Young & Thompson

(57) ABSTRACT

A method for detecting the detachment of a sensor device mounted in a wheel of a motor vehicle at an assembly distance from the center of the wheel. The method includes steps for acquiring (E1) the angular-speed value of the wheel, measuring (E2) the acceleration value of the sensor device, calculating (E3) the distance separating the sensor device from the center of the wheel using the angular-speed value and the acceleration value, and determining (E4) the detachment of the sensor device if the calculated distance is different from the assembly distance of the sensor device in the wheel.

6 Claims, 2 Drawing Sheets

(51) Int. Cl.
*G07C 5/02* (2006.01)
*G01P 3/00* (2006.01)
*B60C 23/04* (2006.01)

(58) Field of Classification Search
CPC .. B60C 11/24; B60C 23/0481; B60C 23/0488
USPC ........................................................ 701/29.7
See application file for complete search history.

(56) References Cited

U.S. PATENT DOCUMENTS

| | | | |
|---|---|---|---|
| 2005/0046584 A1* | 3/2005 | Breed | B60C 11/24 |
| | | | 340/13.31 |
| 2006/0028326 A1 | 2/2006 | Haas | |
| 2006/0208169 A1* | 9/2006 | Breed | B60N 2/002 |
| | | | 250/221 |
| 2012/0173073 A1 | 7/2012 | Hanna | |
| 2014/0172232 A1* | 6/2014 | Rupp | B60W 30/18036 |
| | | | 701/36 |
| 2016/0280267 A1* | 9/2016 | Lavoie | B62D 15/0285 |

FOREIGN PATENT DOCUMENTS

| | | |
|---|---|---|
| DE | 10 2009 044 573 A1 | 5/2011 |
| FR | 2 874 086 A | 2/2006 |
| GB | 2 429 294 A | 2/2007 |
| JP | 2005 170224 A | 6/2005 |

\* cited by examiner

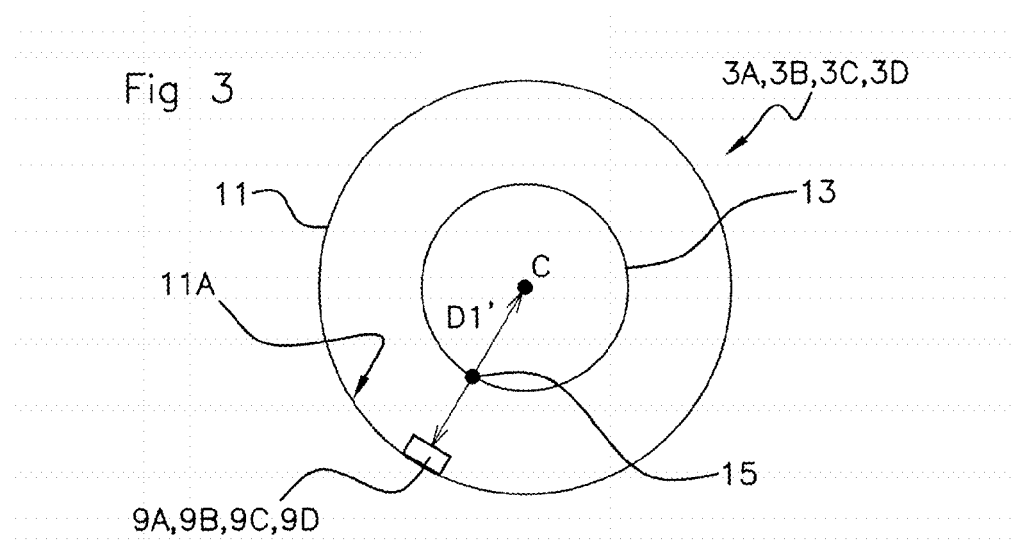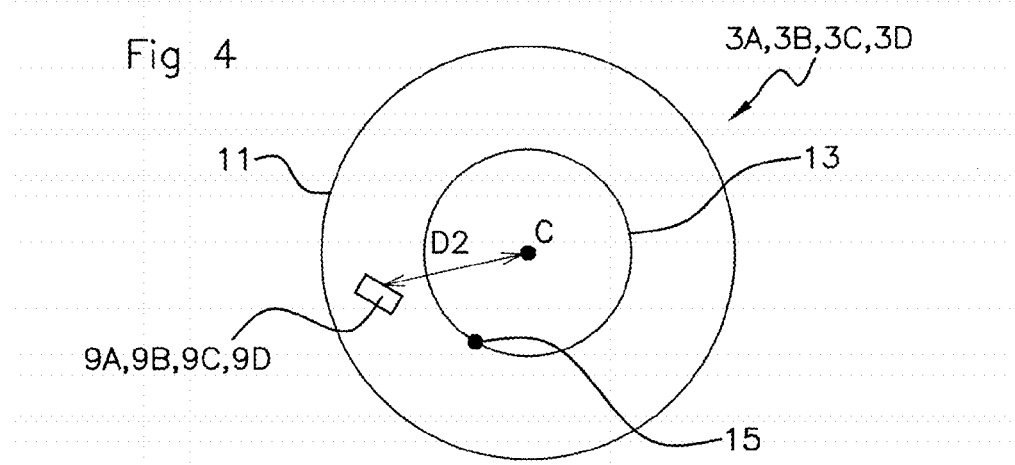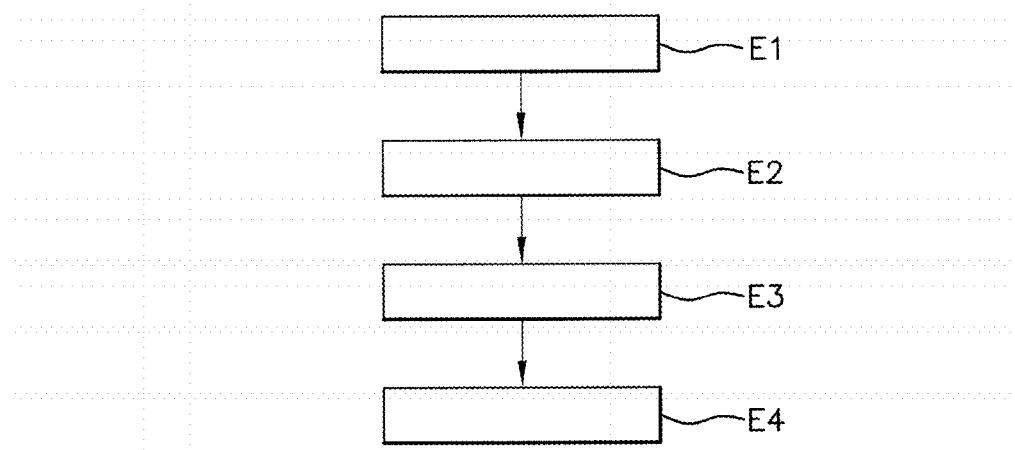

METHOD FOR DETECTING THE DETACHMENT OF A SENSOR DEVICE MOUNTED IN A WHEEL OF A VEHICLE

FIELD OF THE INVENTION

The present invention relates to the domain of motorcars, and more specifically to a method and a device for detecting the detachment of a sensor device mounted in a wheel of a motor vehicle, as well as a motor vehicle fitted with such a device.

BACKGROUND OF THE INVENTION

A motor vehicle is fitted, in a known manner, with a plurality of wheels, each having a wheel rim and a tire mounted on said wheel rim. Nowadays, it is also known to mount a sensor device in each wheel, in particular to measure the pressure inside the corresponding tire. Such a sensor device may, for example, be mounted on an inflation valve of the wheel rim or be attached directly to the inside wall of the tire.

The sensor device sends the values that it measures over a radio link to a control unit of the vehicle, known to the person skilled in the art as an electronic control unit (ECU). This control unit of the vehicle uses these values to assist the driver when driving the vehicle. Thus for example, the control unit of the vehicle warns the driver if the pressure in one of the tires drops, in order to prevent a potential puncture.

When the vehicle is moving, the sensor device is subjected to significant acceleration, the value of which is for example several hundreds of g, g being the acceleration constant ($g=9.81$ m·s$^2$). Consequently, it is not uncommon for the sensor device to become detached and to cease working correctly, preventing the electronic control unit of the vehicle from detecting a pressure drop in the tire, which is a first drawback. Furthermore, detachment of the sensor device may damage the tire, which is a second drawback.

In order to at least partially overcome this drawback, a solution described in document FR 2 874 086 discloses a device for detecting detachment of a sensor device. This method uses the speed of the vehicle and the acceleration of the sensor device to determine a correlation coefficient, the value of which depends only on the distance between the sensor device and the center of the wheel. However, the speed of the wheels may differ significantly from the speed of the vehicle, for example in the event of skidding, and the speed of the wheels may differ from one another, for example on bends and in particular tight bends. Consequently, this method provides an erroneous estimate of the distance between each sensor device and the center of the wheel on which it is mounted, which may prevent detection of the detachment of a sensor device, representing a significant drawback.

SUMMARY OF THE INVENTION

The invention is intended to overcome these drawbacks in the prior art by proposing a simple, reliable and efficient solution for detecting the detachment of a sensor device mounted in a wheel of a motor vehicle.

For this purpose, the invention relates to a method for detecting the detachment of a sensor device mounted in a wheel of a motor vehicle at an assembly distance from the center of said wheel, said method being noteworthy in that it includes the following steps:

acquiring the angular-speed value of the wheel,
measuring the acceleration value of said sensor device,
calculating the distance separating the sensor device from the center of the wheel using said angular-speed value and said acceleration value,
determining the detachment of the sensor device if the calculated distance is different from the assembly distance of the sensor device in the wheel.

The term "assembly distance" means the distance separating the sensor device from the center of the wheel when the sensor device is mounted in the wheel in the usage position, for example when it is attached to an inflation valve extending through the wheel rim of the wheel or on the inside wall of the tire of the wheel.

Preferably, the acquisition step includes a measurement of the angular-speed value of the wheel. Such a measurement may be taken easily using an angular-speed measurement sensor. Measuring the angular speed of the wheel makes it possible to precisely calculate the distance separating the sensor device from the center of the wheel, which makes the method reliable.

In another embodiment, the acquisition step includes an estimate of the angular-speed value of the wheel.

According to an aspect of the invention, the angular-speed value of the wheel is estimated using the speed of the vehicle, the steering angle of same and the radius of curvature of same.

Advantageously, the radius of curvature of the vehicle is determined using a geolocation unit of said vehicle, for example a global positioning system (GPS) unit. Such a geolocation unit is commonly used in vehicles nowadays and can therefore easily be used to obtain the radius of curvature of the vehicle.

According to another aspect of the invention, the angular-speed value of the wheel is estimated using the speed of the vehicle, the steering angle of same and the yaw angle of same, these parameters being easily acquired, notably by measuring.

Advantageously, the yaw angle of the vehicle is determined using a geolocation unit of said vehicle or an electronic stability unit. The geolocation unit of the vehicle may be a global positioning system (GPS) unit. Such a geolocation unit is commonly used in vehicles nowadays and can therefore easily be used to acquire the yaw angle of the vehicle. The electronic stability unit, known to the person skilled in the art as the electronic stability program (ESP), is also commonly used in vehicles nowadays and can therefore easily be used to acquire the yaw angle of the vehicle.

Preferably, since the motor vehicle has a plurality of wheels and a sensor device is mounted in each wheel of said plurality of wheels, the steps of acquiring the angular-speed value, measuring the acceleration value of the sensor device, calculating the distance separating the sensor device from the center of the corresponding wheel, and determining the detachment of the sensor device are carried out for each of the wheels of said plurality of wheels. Consequently, an angular-speed value is acquired for each wheel of the vehicle, which makes it possible to determine the detachment of the sensor device for each wheel of the vehicle and to easily identify the wheel affected by such detachment.

The invention also relates to a device for detecting the detachment of a sensor device mounted in a wheel of a motor vehicle at an assembly distance from the center of said wheel, said detection device being noteworthy in that it comprises:

a unit for acquiring the angular-speed value of the wheel, a unit for measuring the acceleration value of said sensor device, a unit for calculating the distance separating the sensor device from the center of the wheel using an angular-speed value and an acceleration value, a unit for determining the detachment of the sensor device when the calculated distance is different from the assembly distance of the sensor device in the wheel.

Preferably, the unit for acquiring the angular-speed value for said wheel includes an angular-speed sensor for each wheel of the vehicle, for example an anti-lock braking system for the wheels, known to the person skilled in the art as ABS ("Antiblockiersystem" in German).

Also preferably, the measurement unit for the acceleration value of the sensor device includes at least one accelerometer mounted in the sensor device in order to easily measure the acceleration of the sensor device in the wheel.

The invention also relates to a vehicle including a device for detecting the detachment of a sensor device, as disclosed above.

BRIEF DESCRIPTION OF THE DRAWINGS

Other characteristics and advantages of the invention are given in the description below with reference to the attached figures, which are provided by way of non-limiting examples and in which the same reference signs are used for similar objects.

FIG. 3 is a schematic representation of a second example wheel including a sensor device mounted in said wheel.

FIG. 4 is a schematic representation of an example wheel including a sensor device that has become detached from the assembly position of same in said wheel.

FIG. 5 is a schematic representation of an embodiment of the method according to the invention.

DETAILED DESCRIPTION OF THE INVENTION

The detection device according to the invention is designed to be assembled in a motor vehicle, such as a car or truck.

Figure 1:
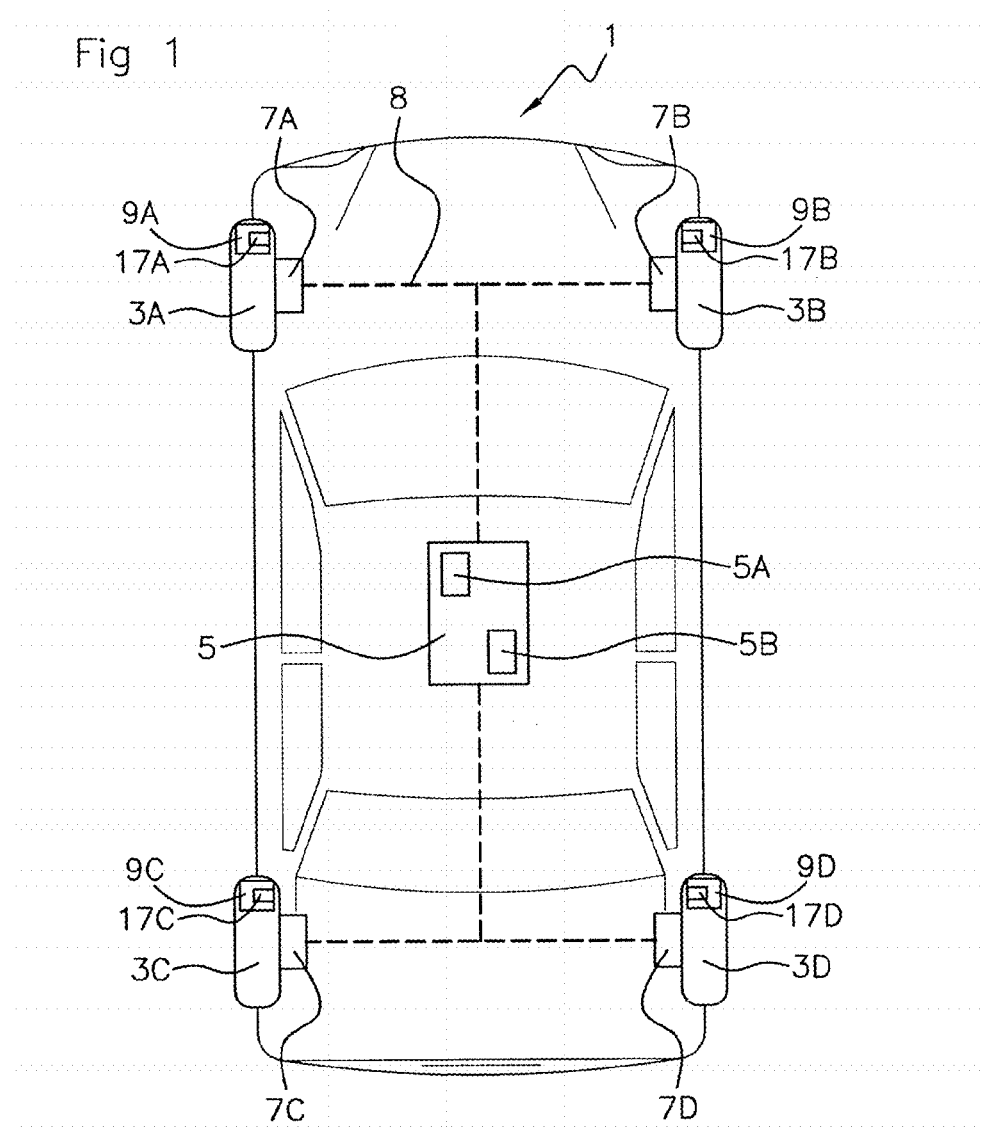
FIG. 1 is a schematic representation of an embodiment of the vehicle according to the invention.

FIG. 1 is a schematic representation of an embodiment of a vehicle 1 according to the invention. This vehicle 1 has four wheels 3A, 3B, 3C, 3D and an electronic control unit 5 of said vehicle 1, known to the person skilled in the art as an ECU.

Such an electronic control unit 5 is a processor used to control the operating parameters of the vehicle 1, in particular using data received from elements of the vehicle 1, such as speed and pressure values, etc.

The vehicle 1 also has an anti-lock braking system for the wheels 3A, 3B, 3C, 3D including four angular-speed sensors 7A, 7B, 7C, 7D, each assembled level with the wheels 3A, 3B, 3C, 3D in order to measure the rotational speed or angular speed of same, respectively ω1, ω2, ω3, ω4. These angular-speed sensors 7A, 7B, 7C, 7D send the angular-speed values ω1, ω2, ω3, ω4 that they measure to the electronic control unit 5 via a communication link 8, for example a controller area network (CAN) bus known to the person skilled in the art.

Figure 2:
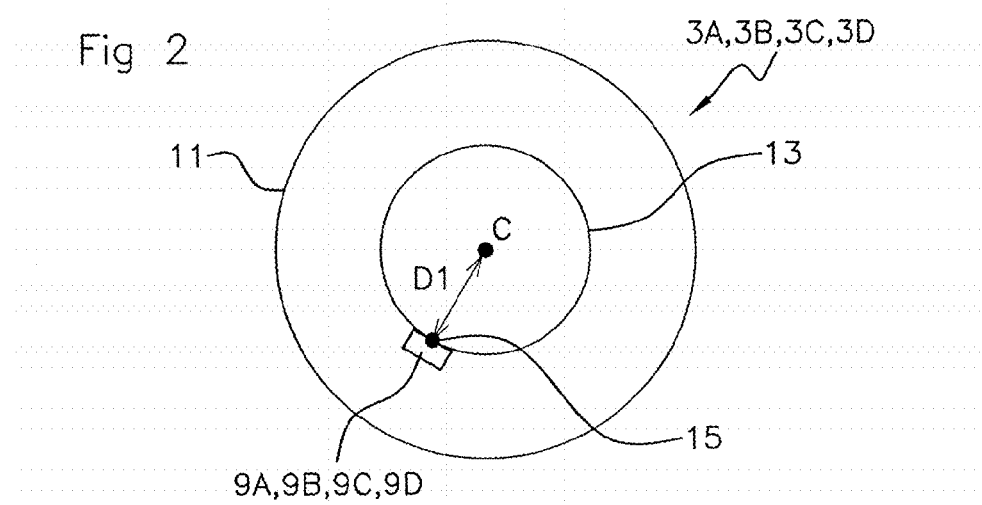
FIG. 2 is a schematic representation of a first example wheel including a sensor device mounted in said wheel.

With reference to FIGS. 2 and 3, each wheel 3A, 3B, 3C, 3D has a sensor device 9A, 9B, 9C, 9D, a tire 11, a wheel rim 13 and a valve 15. The sensor device 9A, 9B, 9C, 9D is notably configured to measure the pressure inside the tire 11 of the wheel 3A, 3B, 3C, 3D in which it is mounted.

The sensor device 9A, 9B, 9C, 9D can for example be mounted, in a position referred to as the "assembly position", on the valve 15 (FIG. 2) or on an inside wall 11A of the tire 11 (FIG. 3). In the assembly position, the sensor device 9A, 9B, 9C, 9D is removed by a distance D1 (see FIG. 2) or D1' (see FIG. 3) from the center C of the wheel 3A, 3B, 3C, 3D. If the sensor device 9A, 9B, 9C, 9D becomes detached, it is at a distance D2 different from the assembly distance D1, as shown in FIG. 4.

The detection device according to the invention makes it possible to detect the detachment of the sensor devices 9A, 9B, 9C, 9D mounted in the wheels 3A, 3B, 3C, 3D of the vehicle 1. For this purpose, the detection device includes an acquisition unit, a measurement unit, a calculation unit and a determination unit.

The acquisition unit is designed to acquire the angular-speed value ω1, ω2, ω3, ω4 of each wheel 3A, 3B, 3C, 3D on which a sensor device 9A, 9B, 9C, 9D is mounted.

In this preferred example described with reference to FIG. 1, the acquisition unit for the angular-speed value of each wheel 3A, 3B, 3C, 3D includes the four angular-speed measurement sensors 7A, 7B, 7C, 7D, each mounted level with a wheel 3A, 3B, 3C, 3D.

In a variant, the acquisition unit can be designed to estimate the angular speed of each wheel 3A, 3B, 3C, 3D.

Such an estimate can be made using the speed of the vehicle $V_{car}$, the steering angle δ of same and the radius of curvature ρ of same. The radius of curvature ρ of the vehicle 1 can be determined using a geolocation unit (not shown) of said vehicle 1, for example a global positioning system (GPS) unit.

By way of example, the radius of curvature can be calculated using the following equation:

$$\rho = \frac{(v_{car})^3}{\|\vec{v}_{car} \times \vec{v}_{car}\|} = \frac{\left(\left(\frac{dx}{dt}\right)^2 + \left(\frac{dy}{dt}\right)^2\right)^{3/2}}{\left(\frac{dx}{dt} \times \frac{d^2y}{dt^2}\right) - \left(\frac{dy}{dt} \times \frac{d^2x}{dt^2}\right)} \quad [1]$$

in which:

$\vec{v}_{car}$ is the speed vector of the vehicle 1, and $v_{car}^3$ is the speed of the vehicle 1 raised to the third power, (x, y) are the ECEF (Earth-Centered, Earth-Fixed) Cartesian coordinates of the vehicle 1 given in a manner known to the person skilled in the art by the GPS unit, $$\frac{dx}{dt}$$

is the derivative of the x coordinate in relation to time t, $$\frac{dy}{dt}$$

is the derivative of the y coordinate in relation to time t, $$\frac{d^2y}{dt^2}$$

is the second derivative of the y coordinate in relation to time t, $$\frac{d^2x}{dt^2}$$

is the second derivative of the x coordinate in relation to time t.

The angular speed ω1, ω2, ω3, ω4 of each wheel 3A, 3B, 3C, 3D of the vehicle 1 can then be determined using the following equations:

$$v_{car} = (\omega_1 \times \cos\delta) \times \frac{\rho}{\left(\rho - \frac{1}{2}s_F\right)} \quad [2]$$

$$v_{car} = (\omega_2 \times \cos\delta) \times \frac{\rho}{\left(\rho + \frac{1}{2}s_F\right)} \quad [3]$$

$$v_{car} = \omega_3 \times \frac{\rho}{\left(\rho - \frac{1}{2}s_F\right)} \quad [4]$$

$$v_{car} = \omega_3 \times \frac{\rho}{\left(\rho - \frac{1}{2}s_F\right)} \quad [5]$$

in which:
- the speed of the vehicle $V_{car}$ can for example be given by the speedometer of the vehicle 1,
- δ is the steering angle of the vehicle 1, which may for example be given by the steering column of the vehicle 1,
- $S_F$ is the distance separating the two centers of the front wheels (3A, 3B) or of the rear wheels (3C, 3D) of the vehicle 1.
- ρ is the radius of curvature of the vehicle 1.

Alternatively, the angular-speed value of the wheel 3A, 3B, 3C, 3D can be estimated using the speed of the vehicle $V_{car}$, the steering angle δ of same, and the yaw angle ϕ of same.

The yaw angle ϕ can be determined using a geolocation unit of said vehicle 1, for example a global positioning system (GPS) unit.

The yaw angle Φ is given by the following formula:

$$\varphi = a\sin\left(\frac{\frac{dy}{dt}}{v_{car}}\right) = a\cos\left(\frac{\frac{dx}{dt}}{v_{car}}\right) \quad [6]$$

where (x, y) are the ECEF (Earth-Centered, Earth-Fixed) Cartesian coordinates of the vehicle 1 given in a manner known to the person skilled in the art by the GPS unit.

In a variant, the yaw angle ϕ can be provided directly by the geolocation unit (using the heading angle, i.e. the angle in relation to north).

In another variant, the yaw angle ϕ can be provided directly by an electronic stability unit (not shown) known to the person skilled in the art as the electronic stability program (ESP) commonly used in vehicles nowadays.

The measurement unit is designed to measure the acceleration value a1, a2, a3, a4 of each sensor device 9A, 9B, 9C, 9D. In the preferred example described with reference to FIG. 1, the measurement unit for the acceleration value of each sensor device 9A, 9B, 9C, 9D includes four accelerometers 17A, 17B, 17C, 17D each mounted in one of the sensor devices 9A, 9B, 9C, 9D or each coupled to one of the sensor devices 9A, 9B, 9C, 9D.

The calculation unit is designed to calculate the distance D separating each sensor device 9A, 9B, 9C, 9D from the center of the wheel 3A, 3B, 3C, 3D on which it is mounted using an angular-speed value ω1, ω2, ω3, ω4 acquired by the acquisition unit and an acceleration value a1, a2, a3, a4 measured by the measurement unit.

The determination unit is designed to determine the detachment of a sensor device 9A, 9B, 9C, 9D from a tire 11 if a distance D calculated by the calculation unit is different from the assembly distance D1, D1' of said sensor device 9A, 9B, 9C, 9D in the related wheel 3A, 3B, 3C, 3D.

Each sensor device 9A, 9B, 9C, 9D is designed to communicate over a radio link (not shown) with the electronic control unit 5, in particular to send the pressure values and the acceleration values measured to same.

In this embodiment, the calculation unit 5A and the determination unit 5B (see FIG. 1) are software means advantageously implemented by the electronic control unit (ECU) 5 of the vehicle 1. The electronic control unit 5 is therefore configured to receive, from the four sensor devices 9A, 9B, 9C, 9D, the pressure values and the acceleration values that they have measured and sent.

The invention is described below as implemented with reference to the embodiment shown in FIG. 1.

When the vehicle 1 is moving, each angular-speed sensor 7A, 7B, 7C, 7D of the ABS system measures the angular speed ω1, ω2, ω3, ω4 of the wheel 3A, 3B, 3C, 3D level with which it is mounted, then it sends this information over the communication link 8 to the electronic control unit 5 of the vehicle 1. In a variant, the angular speed ω1, ω2, ω3, ω4 of each wheel 3A, 3B, 3C, 3D can be estimated as explained above.

Simultaneously, the accelerometer 17A, 17B, 17C, 17D of each sensor device 9A, 9B, 9C, 9D measures the acceleration a1, a2, a3, a4 of said sensor device 9A, 9B, 9C, 9D, which sends, over the radio link, the acceleration value a1, a2, a3, a4 measured at the electronic control unit 5 of the vehicle 1.

The calculation unit 5A, implemented by the electronic control unit 5 of the vehicle 1, then calculates, for each wheel 3A, 3B, 3C, 3D and using the angular-speed- and acceleration values a1, a2, a3, a4 received, the distance D separating the sensor device 9A, 9B, 9C, 9D from the center C of the wheel 3A, 3B, 3C, 3D in which it is mounted, using the following equation:

$$D = \frac{a}{\omega^2} \quad [7]$$

The determination unit 5B, implemented by the electronic control unit 5 of the vehicle 1, then compares, for each wheel 3A, 3B, 3C, 3D, the distance D calculated by the calculation unit 5A with the assembly distance D1, D1' of the sensor device 9A, 9B, 9C, 9D. Then, if the distance D calculated is equal to the assembly distance D1 of the sensor device 9A, 9B, 9C, 9D, it means that the sensor device 9A, 9B, 9C, 9D has not become detached. Conversely, if the distance D calculated is equal to a distance D2 different to the assembly distance D1, D1' of the sensor device 9A, 9B, 9C, 9D, it means that the sensor device 9A, 9B, 9C, 9D has become detached. This assembly distance D1, D1' can for example be predetermined and stored by the electronic control unit 5 of the vehicle 1. In a variant, the determination unit 5B can compare over time, for each wheel 3A, 3B, 3C, 3D, the distance D calculated between the sensor device 9A, 9B, 9C, 9D and the center C of the wheel 3A, 3B, 3C, 3D, and determine that the sensor device 9A, 9B, 9C, 9D has become detached if this distance D varies (i.e. is not constant).

The device and the method according to the invention thereby make it possible to easily and efficiently detect the detachment of a sensor device 9A, 9B, 9C, 9D mounted in a wheel 3A, 3B, 3C, 3D of a motor vehicle 1. In particular, the use of the angular speed of each wheel 3A, 3B, 3C, 3D enables the reliable and precise detection of the detachment of one or more sensor devices 9A, 9B, 9C, 9D.

It should be noted that the present invention is not limited to the examples described above and is subject to numerous variants available to the person skilled in the art. In particular, the number of wheels 3A, 3B, 3C, 3D, the entities implementing the acquisition unit, the measurement unit, the calculation unit and the determination unit, as shown in the figures to illustrate an example embodiment of the invention, should not be understood to be limiting.

The invention claimed is:

1. A method for detecting the detachment of a sensor device (9A, 9B, 9C, 9D) mounted on a wheel (3A, 3B, 3C, 3D) of a motor vehicle (1) at an assembly distance (D1, D1') from the center (C) of said wheel (3A, 3B, 3C, 3D), said method comprising the following steps:

acquiring (E1) an angular-speed value ($\omega 1, \omega 2, \omega 3, \omega 4$) of the wheel (3A, 3B, 3C, 3D), measuring (E2) by a unit (17A, 17B, 17C, 17D) an acceleration value (a1, a2, a3, a4) of said sensor device (9A, 9B, 9C, 9D), calculating (E3) by a unit (5A) a distance (D) separating the sensor device from the center (C) of the wheel (3A, 3B, 3C, 3D) using said angular-speed value ($\omega 1, \omega 2, \omega 3, \omega 4$) and said acceleration value (a1, a2, a3, a4), determining (E4) by a unit (5B) the detachment of the sensor device (9A, 9B, 9C, 9D) when the calculated distance (D) is different from the assembly distance (D1, D1') of the sensor device (9A, 9B, 9C, 9D) in the wheel (3A, 3B, 3C, 3D), wherein the acquisition step includes an estimation of the angular-speed value ($\omega 1, \omega 2, \omega 3, \omega 4$) of the wheel (3A, 3B, 3C, 3D) carried out using the speed of the vehicle (1), the steering angle ($\delta$) of same and the radius of curvature ($\rho$) of same.

2. The method as claimed in claim 1, wherein the radius of curvature ($\rho$) of the vehicle (1) is determined using a geolocation unit of said vehicle (1).

3. A device for detecting the detachment of a sensor device (9A, 9B, 9C, 9D) mounted on a wheel (3A, 3B, 3C, 3D) of a motor vehicle (1) at an assembly distance (D1, D1') from the center (C) of said wheel (3A, 3B, 3C, 3D), said detection device comprising:

a unit (7A, 7B, 7C, 7D) for acquiring the angular-speed value ($\omega 1, \omega 2, \omega 3, \omega 4$) of the wheel (3A, 3B, 3C, 3D), a unit (17A, 17B, 17C, 17D) for measuring the acceleration value (a1, a2, a3, a4) of said sensor device (9A, 9B, 9C, 9D), a unit (5A) for calculating the distance (D) separating the sensor device (9A, 9B, 9C, 9D) from the center (C) of the wheel (3A, 3B, 3C, 3D) using an angular-speed value ($\omega 1, \omega 2, \omega 3, \omega 4$) and an acceleration value (a1, a2, a3, a4), unit (5B) for determining the detachment of the sensor device (9A, 9B, 9C, 9D) when the calculated distance (D) is different from the assembly distance (D1, D1') of the sensor device (9A, 9B, 9C, 9D) in the wheel.

4. The device as claimed in claim 3, wherein the unit for acquiring the angular-speed value ($\omega 1, \omega 2, \omega 3, \omega 4$) of said wheel (3A, 3B, 3C, 3D) includes one sensor (7A, 7B, 7C, 7D) of angular speed ($\omega 1, \omega 2, \omega 3, \omega 4$) per wheel (3A, 3B, 3C, 3D).

5. A vehicle (1) including a device for detecting the detachment of a sensor device (9A, 9B, 9C, 9D) as claimed in claim 3.

6. A vehicle (1) including a device for detecting the detachment of a sensor device (9A, 9B, 9C, 9D) as claimed in claim 4.

\* \* \* \* \*

UNITED STATES PATENT AND TRADEMARK OFFICE
CERTIFICATE OF CORRECTION

PATENT NO. : 9,773,359 B2  
APPLICATION NO. : 14/959688  
DATED : September 26, 2017  
INVENTOR(S) : Andrei Cimponeriu and Olivier Fudulea Page 1 of 1

It is certified that error appears in the above-identified patent and that said Letters Patent is hereby corrected as shown below:

On the Title Page

Item (72):  
"(72) Inventors: Andrei Cimponeriu, Timisoara (RO);  
    Olivier Fudelea, Toulouse (FR)"

Should be replaced with:  
--(72) Inventors: Andrei Cimponeriu, Timisoara (RO);  
    Olivier Fudulea, Toulouse (FR)--

Signed and Sealed this  
Sixteenth Day of April, 2019

Andrei Iancu  
*Director of the United States Patent and Trademark Office*